(12) United States Patent
Yu et al.

(10) Patent No.: US 8,908,570 B2
(45) Date of Patent: Dec. 9, 2014

(54) CONTROL SIGNAL MANAGEMENT SYSTEM AND METHOD

(75) Inventors: Yi Yu, Ottawa (CA); Zhijun Cai, Euless, TX (US); James Earl Womack, Bedford, TX (US)

(73) Assignee: BlackBerrry Limited, Waterloo, Ontario (CA)

( * ) Notice: Subject to any disclaimer, the term of this patent is extended or adjusted under 35 U.S.C. 154(b) by 1552 days.

(21) Appl. No.: 12/024,873

(22) Filed: Feb. 1, 2008

(65) Prior Publication Data

US 2009/0196208 A1     Aug. 6, 2009

(51) Int. Cl.
*H04B 7/005* (2006.01)
*H04W 52/02* (2009.01)
*H04W 76/04* (2009.01)

(52) U.S. Cl.
CPC ........ *H04W 76/048* (2013.01); *H04W 52/0216* (2013.01); *H04W 76/04* (2013.01)
USPC ............................................. 370/278; 398/41

(58) Field of Classification Search
CPC .................................................. H04W 76/048
USPC ................. 370/278, 311, 329, 338, 331, 335; 455/458, 435.1, 418, 552.1
See application file for complete search history.

(56) References Cited

U.S. PATENT DOCUMENTS

| | | | | |
|---|---|---|---|---|
| 5,910,944 A | * | 6/1999 | Callicotte et al. | 370/311 |
| 6,016,312 A | * | 1/2000 | Storm et al. | 370/311 |
| 7,085,246 B1 | * | 8/2006 | LaRosa et al. | 370/311 |
| 8,644,250 B2 | * | 2/2014 | Chun et al. | 370/331 |
| 2007/0097928 A1 | * | 5/2007 | Anderson | 370/335 |
| 2007/0149244 A1 | * | 6/2007 | Choi | 455/552.1 |
| 2007/0254656 A1 | * | 11/2007 | Dalsgaard | 455/435.1 |
| 2008/0188247 A1 | * | 8/2008 | Worrall | 455/458 |
| 2008/0233941 A1 | * | 9/2008 | Jen | 455/418 |
| 2009/0180447 A1 | * | 7/2009 | Kim et al. | 370/338 |
| 2010/0062795 A1 | * | 3/2010 | Lee | 455/458 |
| 2010/0165927 A1 | * | 7/2010 | Kim et al. | 370/329 |

FOREIGN PATENT DOCUMENTS

| | | |
|---|---|---|
| CN | 1194557 A | 9/1998 |
| EP | 0529269 A2 | 7/1992 |
| EP | 1318687 A2 | 6/2003 |
| JP | 09-098476 A | 4/1997 |
| JP | 11-069406 A | 3/1999 |
| JP | 2005020772 A | 1/2005 |
| JP | 2008005550 A | 1/2008 |
| KR | 20050023822 | 3/2005 |
| KR | 20060066991 | 6/2006 |
| KR | 20060128694 A | 12/2006 |
| KR | 20070008895 | 1/2007 |
| WO | 2007073118 A1 | 6/2007 |

OTHER PUBLICATIONS

DRX and DTX in LTE Active Mar. 27 2006.*

(Continued)

*Primary Examiner* — Dang Ton
*Assistant Examiner* — Lionel Preval
(74) *Attorney, Agent, or Firm* — Conley Rose, P.C.; J. Robert Brown, Jr.

(57) ABSTRACT

A user equipment (UE) including a processor configured to transmit control plane data irrespective of on-duration/off-duration status.

14 Claims, 6 Drawing Sheets

(56) References Cited

OTHER PUBLICATIONS

ETSI TS 136 300 V8.2.0; Universal Mobile Telecommunications System (UMTS); Evolved Universal Terrestrial Radio Access (E-UTRA) and Evolved Universal Terrestrial Radio Access (E-UTRAN); Overall description; Stage 2 (3GPP TS 36.300 V8.2.0) Release 8; Oct. 2007; 112 pgs.
3GPP TSG RAN WG1 #49bis; Texas Instruments; Scheduling Request and DRX in E-UTRA; R1-072859; Orlando, Florida; Jun. 25-29, 2007; 5 pgs.
3GPP TSG RAN WG2 #56; NTT DoCoMo, Inc.; Requirement on DRX/DTX Control in LTE; R2-063396; Riga, Latvia; Nov. 6-10, 2006; 3 pgs.
TSG-RAN Meeting #52; Ericsson; DRX and DTX in LTE_Active; R2-060967; Athens, Greece; Mar. 27-31, 2006; 5 pgs.
3GPP TSG RAN1#47-bis; Motorola; Dynamic Contention Free Scheduling Request; R1070041; Sorrento, Italy, Jan. 15-19, 2006; 3 pgs.
EP Extended European Search Report; EP Application No. 08154498.3; Dec. 30, 2008; 14 pgs.
3rd Generation Partnership Project; Technical Specification Group Radio Access Network; Title: Evolved Universal Terrestrial Radio Access (E-UTRA) Medium Access Control (MAC) Protocol Specification; Release 8; 3GPP TS 36.321 v8.1.0; Mar. 2008; 30 pgs.
NTT DoCoMo, Inc.; 3GPP TSG RAN WG2 #61; Title: Paging Consolidation; R2-081167; Sorrento, Italy; Feb. 11-15, 2008; 5 pgs.
European Examination Report; Application No. 08154498.3; Jul. 13, 2011; 5 pages.
Mexican Office Action; Application No. MX/a/2010/008476; Aug. 12, 2011; 5 pages.
PCT International Search Report; PCT Application No. PCT/US2009/030963; Aug. 20, 2009; 4 pgs.
PCT Written Opinion of the International Searching Authority; PCT Application No. PCT/US2009/030963; Aug. 20, 2009; 5 pgs.
3GPP TSG RAN WG2 #56; Title: "Requirements on DRX/DTX Control in LTE"; NTT DoCoMo, Inc.; R2-063396; Riga, Latvia; Nov. 6-10, 2006; 3 pgs.
Partial EP Search and Examination Report; EP Application No. EP08154498; Aug. 28, 2008; 5 pgs.
Third European Examination Report; EP Application No. 08154498.3; Sep. 17, 2010; 5 pgs.
European Extended Search Report; Application No. 11181429.9; Dec. 20, 2011; 10 pages.
Chinese Office Action; Application No. 200980110551.0; Oct. 10, 2012; 7 pages.
Korean Office Action; Application No. 10-2010-7019259; Jan. 9, 2012; 9 pages.
Japanese Office Action; Application No. 2010-545054; May 29, 2012; 8 pages.
Australian Office Action; Application No. 2009210637; Jul. 19, 2012; 3 pages.
3GPP TS 36.300 V8.2.0; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2; Release 8; Sep. 2007; 14 pages.
Korean Notice of Decision for Patent; Application No. 10-2010-7019259; Jul. 25, 2012; 3 pages.
3GPP TSG RAN1 #47-bis; "Dynamic Contention Free Scheduling Request"; R1-070041; Sorrento, Italy; Jan. 15-19, 2006; 3 pages.
PCT International Preliminary Report on Patentability; Application No. PCT/US2009/030963; May 20, 2010; 5 pages.
Chinese Office Action; Application No. 200980110551.0; Jul. 29, 2013; 12 pages.
3GPP TSG-RAN2 Meeting #60bis; "Recovery and Cleanup of E-UTRA MAC Editor's Notes"; R2-080322; Sevilla, Spain; Jan. 14-18, 2008; 18 pages.
European Extended Search Report; Application No. 14164757.8; May 19, 2014; 8 pages.

\* cited by examiner

CONTROL SIGNAL MANAGEMENT SYSTEM AND METHOD

BACKGROUND

Easily transportable devices with wireless telecommunications capabilities, such as mobile telephones, personal digital assistants, handheld computers, and similar devices, will be referred to herein as user equipment (UE). The term "user equipment" may refer to a device and its associated Universal Integrated Circuit Card (UICC) that includes a Subscriber Identity Module (SIM) application, a Universal Subscriber Identity Module (USIM) application, or a Removable User Identity Module (R-UIM) application or may refer to the device itself without such a card. A UE might communicate with a second UE, some other element in a telecommunications network, an automated computing device such as a server computer, or some other device. A communications connection between a UE and another component might promote a voice call, a file transfer, or some other type of data exchange, any of which can be referred to as a call or a session.

As telecommunications technology has evolved, more advanced network access equipment has been introduced that can provide services that were not possible previously. This advanced network access equipment might include, for example, an enhanced node B (ENB) rather than a base station or other systems and devices that are more highly evolved than the equivalent equipment in a traditional wireless telecommunications system. Such advanced or next generation equipment may be referred to herein as long-term evolution (LTE) equipment.

Some UEs have the capability to communicate in a packet switched mode, wherein a data stream representing a portion of a call or session is divided into packets that are given unique identifiers. The packets might then be transmitted from a source to a destination along different paths and might arrive at the destination at different times. Upon reaching the destination, the packets are reassembled into their original sequence based on the identifiers. Voice over Internet Protocol (VoIP) is a well-known system for packet switched-based voice communication over the Internet. The term "VoIP" will refer herein to any packet switched voice call connected via the Internet, regardless of the specific technology that might be used to make the call.

For a wireless VoIP call, the signal that carries data between a UE and an ENB can have a specific set of frequency, code, and time parameters and other characteristics that might be specified by the ENB. A connection between a UE and an ENB that has a specific set of such characteristics can be referred to as a resource. An ENB typically establishes a different resource for each UE with which it is communicating at any particular time.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In an embodiment, a user equipment (UE) is provided that includes a processor configured to transmit control plane data irrespective of on-duration/off-duration status.

In another embodiment, a user equipment (UE) is provided that is configured to transmit a control signal to an enhanced node B (ENB). The UE includes a component configured to interrupt a scheduled off-duration to establish a resource between the UE and the ENB and to transmit the control signal over the resource at substantially the same time the control signal is generated.

In another embodiment, a method for transmitting a control signal from a user equipment (UE) to an enhanced node B (ENB) is provided. The method includes interrupting a scheduled off-duration to establish a resource between the UE and the ENB. The method includes transmitting the control signal over the resource at substantially the same time the control signal is generated.

Figure 1:
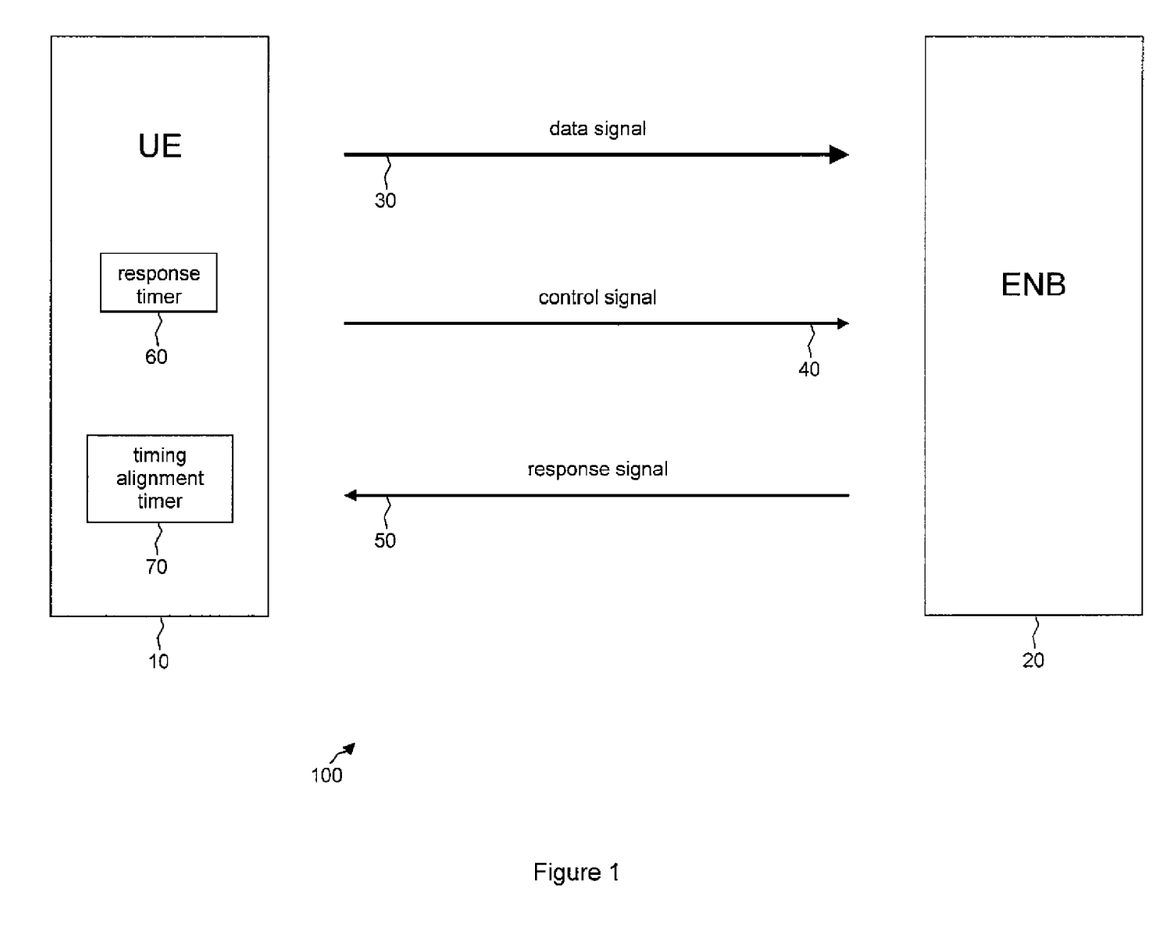
FIG. 1 is a block diagram of a telecommunications system according to an embodiment of the disclosure.

FIG. 1 illustrates an embodiment of a wireless telecommunications system 100 that includes a UE 10 capable of communicating with an ENB 20 or a similar component. Transmissions of various types of information can take place between the UE 10 and the ENB 20. For example, the UE 10 might send the ENB 20 various types of application layer data such as VoIP data packets and data packets containing information related to web browsing, emailing, and other user applications, all of which may be referred to as user plane data. Other types of information related to the UE's application layer will be familiar to one of skill in the art. Any signal containing such information will be referred to herein as a data signal 30. Information associated with a data signal 30 will be referred to herein as user plane data.

The UE 10 might also send the ENB 20 various types of control signaling such as layer 1 scheduling requests, layer 2 radio resource control (RRC) messages and mobility measurement messages, and other control messages, all of which may be referred to as control plane data, and is familiar to one of skill in the art. The UE 10 typically generates such messages as needed to initiate or maintain a call. Any such signal will be referred to herein as a control signal 40. Information associated with a control signal 40 will be referred to herein as control plane data.

In some cases, a dedicated channel might exist between the UE 10 and the ENB 20 via which control plane data may be sent or requests to send control plane data may be sent. In other cases, a random access channel (RACH) may be used for these purposes. That is, in some cases, a request for resources to send control plane data may be sent via a RACH, and, in other cases, the control plane data itself might be sent via a RACH.

When the UE 10 sends a control signal 40 to the ENB 20, the ENB 20 might return a response signal or other control signal to the UE 10. For example, if the UE 10 sends a mobility measurement message to the ENB 20, the ENB 20 might respond by sending an acknowledgement message or some other handover-related control message to the UE 10. Other types of responses that the ENB 20 might send upon receiving a control signal 40 from the UE 10 will be familiar to one of skill in the art. Any such response by the ENB 20 to a control signal 40 sent by the UE 10 will be referred to herein as a response signal 50.

In order to save battery power, the UE 10 might periodically alternate between a high-power mode and a low-power mode. For example, using techniques known as discontinuous reception (DRX) and discontinuous transmission (DTX), the UE 10 might periodically enter short periods of relatively high power consumption during which data can be transmitted and received. Such periods will be referred to herein as on-durations. Between the on-durations, the UE 10 might enter longer periods in which power consumption is reduced and data is not transmitted or received. Such periods will be referred to as off-durations. A balance between power savings and performance can be achieved by making the off-durations as long as possible while still keeping the on-durations long enough for the UE 10 to properly transmit and receive data.

The term "DRX" is sometimes used generically to refer to either discontinuous reception or discontinuous transmission. To avoid confusion, the terms "on-duration" and "off-duration" will be used herein to refer to a UE's capability to transmit and receive data, regardless of whether the data is being transmitted from or received by the UE 10.

Figure 2:
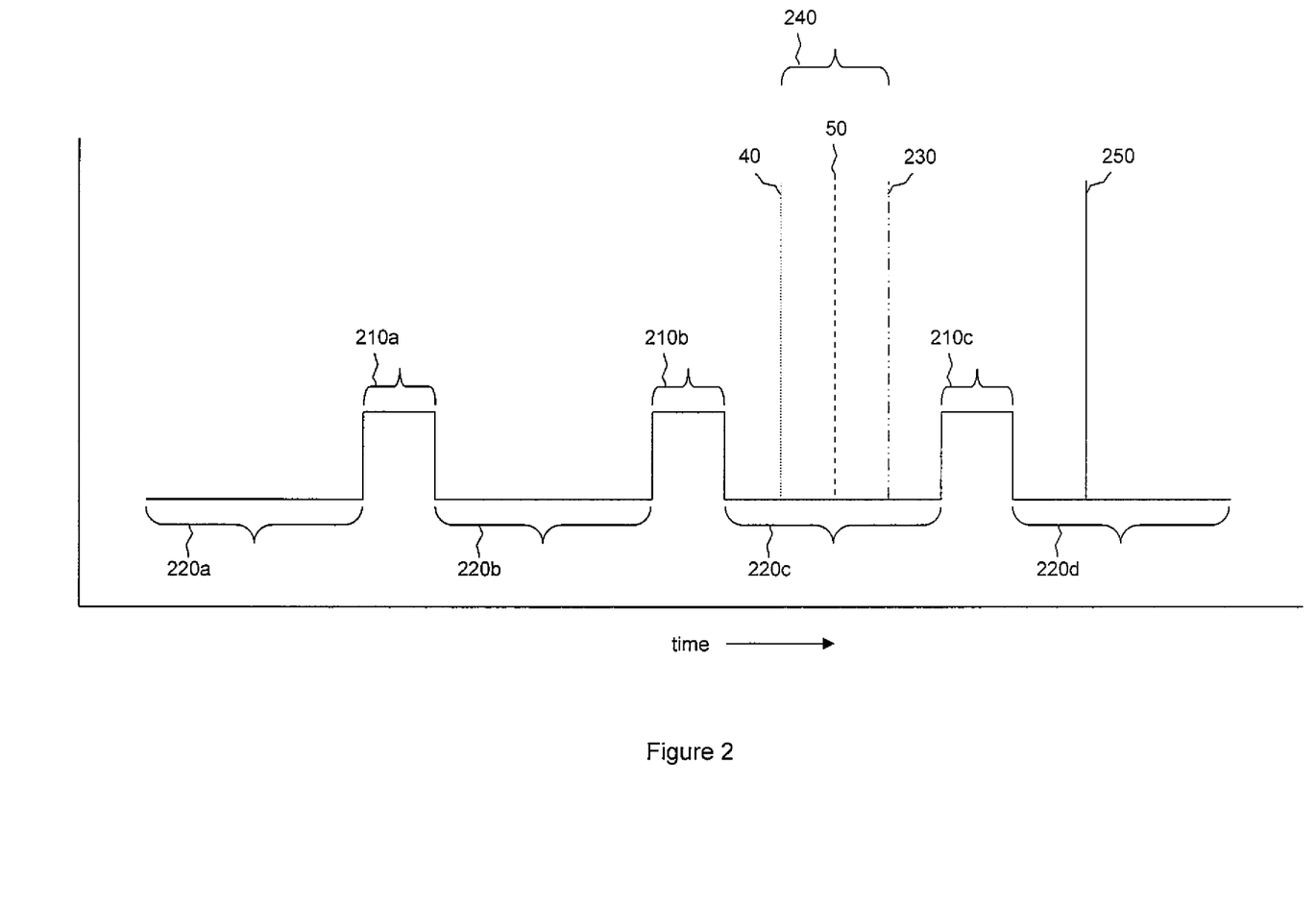
FIG. 2 is a diagram illustrating on-durations and off-durations for a user equipment according to an embodiment of the disclosure.

FIG. 2 illustrates an idealized view of on-durations and off-durations for the UE 10. On-durations 210 with higher power usage alternate in time with off-durations 220 with lower power usage. Traditionally, the UE 10 transmits and receives data only during the on-durations 210 and does not transmit or receive data during the off-durations 220. As an example, it might be determined that an entire cycle of one on-duration 210 and one off-duration 220 should last 20 milliseconds. Of this cycle, it might be determined that an on-duration 210 of 5 milliseconds is sufficient for the UE 10 to transmit and receive data without significant loss of information. The off-duration 220 would then last 15 milliseconds.

The determination of the sizes of the on-durations 210 and the off-durations 220 might be based on the quality of service (QoS) parameters of an application. For example, a VoIP call might need a higher level of quality (e.g., less delay) than an email transmission. When a call is being set up, the UE 10 and the ENB 20 enter a service negotiation stage in which a QoS is negotiated based on the maximum allowable delay, the maximum allowable packet loss, and similar considerations. The level of service to which the user of the UE 10 subscribes might also be factor in the QoS negotiations. When the QoS parameters for a call have been established, the ENB 20 sets the appropriate sizes for the on-durations 210 and the off-durations 220 based on that QoS level.

In an embodiment, control signals 40 generated by the UE 10 are transmitted to the ENB 20 at substantially the same time that the control signals 40 are generated, regardless of the status of the on-durations 210 and the off-durations 220 at the time the control signals 40 are transmitted. That is, if a control signal 40 is generated during what would otherwise be an off-duration 220, the UE 10 briefly enters an unscheduled on-duration during which a resource is established between the UE 10 and the ENB 20. The unscheduled on-duration is of a long enough duration to allow the transmission of the control signal 40. Control signals 40 generated during regularly scheduled on-durations 210 are transmitted during the on-durations 210 in the standard manner. Data signals 30 are also transmitted during on-durations 210 in the standard manner.

By transmitting the control signals 40 as soon as possible after the control signals 40 are generated, service quality may be improved. For example, if the ENB 20 receives a mobility measurement message from the UE 10 shortly after the UE 10 makes the measurement, the UE's call might be less likely to be dropped during a handover compared to the case where the ENB 20 receives the mobility measurement message some time later during a scheduled wake period 210. This procedure can also reduce the complexity of the protocols for the control signals 40. For example, previously it may have been necessary to open the payload of a message to determine whether the message was a measurement-related message. By treating all control signals 40 in the manner described herein, the determination of whether a message is a measurement-related message can be simplified.

As mentioned previously, the ENB 20 might send the UE 10 a response signal or other control signal 50 after receiving a control signal 40 from the UE 10. If the control signal 40 is sent during an off-duration 220, a resource is established during the off-duration 220 to allow transmission of the control signal 40. In an embodiment, the UE 10 wakes up long enough to allow the UE 10 to receive a response signal or other control signal 50. A response timer 60 might be started at the time the UE 10 sends the control signal 40' and the UE 10 will remain awake for the duration of time that the response timer 60 runs. The response timer's run time might be set long enough so that any response signal 50 that the UE 10 is likely to receive will be received within the response timer's run time. The response timer's run time might be specified by the ENB 20, and the ENB 20 might then transmit this information to the response timer 60. The response timer 60 would then run for the time specified by the ENB 20. The response timer 60 might be located in the UE 10, as shown in FIG. 1, or might be located elsewhere.

This is illustrated in FIG. 2, where a control signal 40 is generated during off-duration 220c. As discussed previously, a resource is established between the UE 10 and the ENB 20 to allow for transmission of the control signal 40, even though the UE 10 would otherwise be in an off-duration. The response timer 60 is started when the control signal 40 is sent and the UE 10 remains awake until the response timers end time 230 is reached. The length of time that is likely to pass before the response signal 50 is received may be known. The response timer's end time 230 can be set to provide a timer run time 240 that is long enough that the response signal 50 will likely be received during the run time 240, while the UE 10 is still awake.

As mentioned previously, one of the control signals 40 that the UE 10 might send to the ENB 20 is a scheduling request (SR) sent over an SR channel. The SR channel is a dedicated channel between the UE 10 and the ENB 20 that is established specifically for the purpose of providing the UE 10 a channel for requesting resources from the ENB 20. When the UE 10 sends an SR by placing an indicator on the SR channel, the ENB 20 interprets this as a request for resources. The ENB 20 might then grant an uplink resource to the UE 10.

In an embodiment, the transmission of SRs is independent of the UE's on-durations 210 and off-durations 220. That is, like the control signals 40, SRs are transmitted at approximately the time the SRs are generated, regardless of whether the UE 10 is in an on-duration 210 or an off-duration 220. This is illustrated in FIG. 2, where an SR 250 is transmitted during off-duration 220d.

It is well known in the art that synchronization between the UE 10 and the ENB 20 might be needed for communication to take place between those two entities. To achieve this synchronization, the ENB 20, or some other component, might include a timing alignment component that periodically sends a timing alignment signal to the UE 10 to keep the ENB 20 and the UE 10 in synchronization. If the UE 10 does not receive such a timing alignment signal from the ENB 20 for an extended period of time, synchronization between the UE 10 and the ENB 20 might be lost.

In an embodiment, a timing alignment timer 70 can keep track of the amount of time that has elapsed since the UE 10 received a timing alignment signal from the ENB 20. In an embodiment, if the timing alignment timer 70 expires, the SR channel is released. That is, if the UE 10 does not receive a timing alignment signal within the timing alignment timers run time, the UE 10 releases the SR channel. The timing alignment timer 70 might be located in the UE 10, as shown in FIG. 1, or might be located elsewhere.

Alternatively or in addition, a timer related to timing alignment might be maintained by the ENB 20. If the ENB 20 does not receive control plane data, user plane data, or other data from the UE 10 before this ENB-based timer expires, the ENB 20 might assume that synchronization has been lost and might instruct the UE 10 to release the SR channel.

Figure 3:
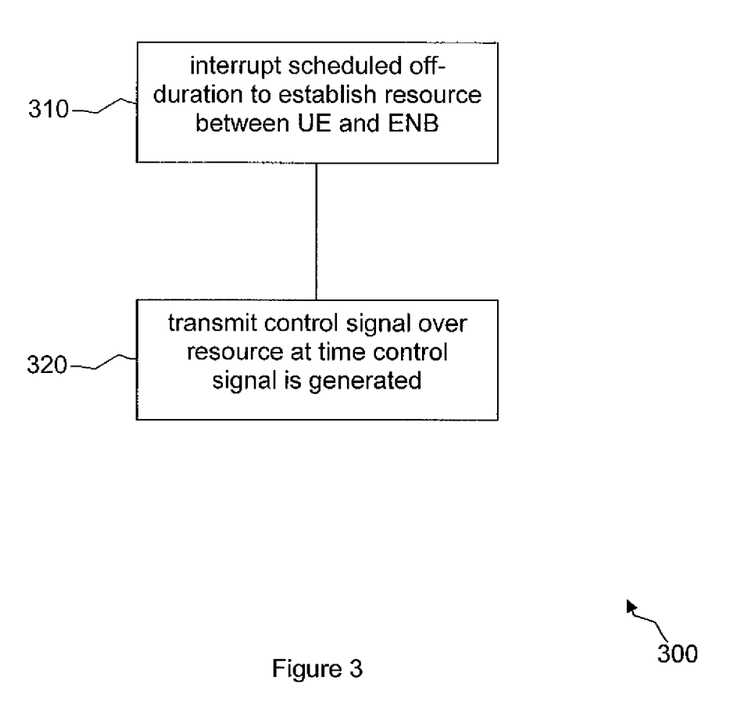
FIG. 3 is a diagram of a method for a transmitting control signal according to an embodiment of the disclosure.

FIG. 3 illustrates an embodiment of a method 300 for transmitting control signals from a UE to an ENB. At block 310, a scheduled off-duration is interrupted to establish a resource between the UE and the ENB. At block 320, the control signal is transmitted over the resource at substantially the same time the control signal is generated.

Figure 4:
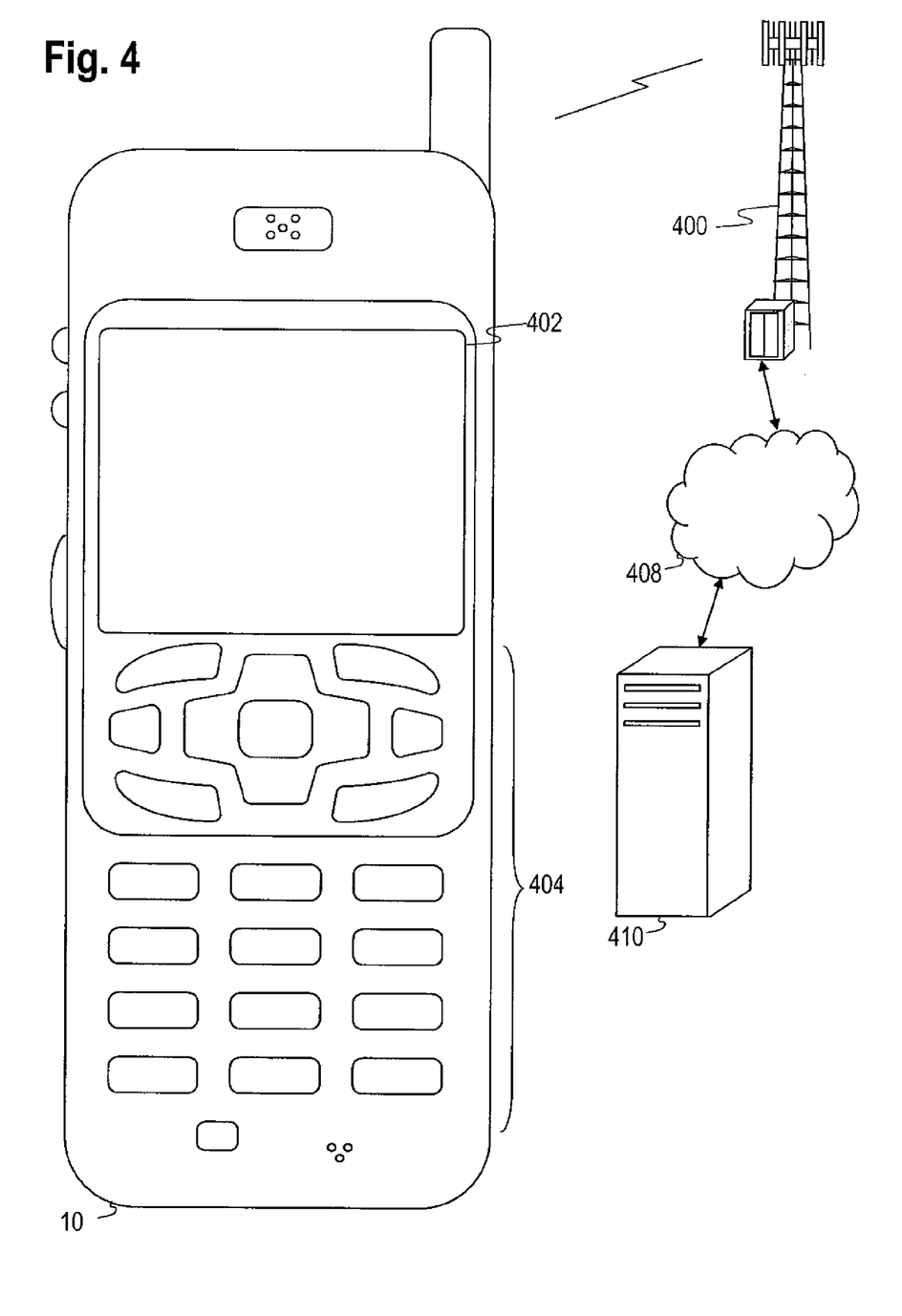
FIG. 4 is a diagram of a wireless communications system including a user equipment operable for some of the various embodiments of the disclosure.

FIG. 4 illustrates a wireless communications system including an embodiment of the UE 10. The UE 10 is operable for implementing aspects of the disclosure, but the disclosure should not be limited to these implementations. Though illustrated as a mobile phone, the UE 10 may take various forms including a wireless handset, a pager, a personal digital assistant (PDA), a portable computer, a tablet computer, or a laptop computer. Many suitable devices combine some or all of these functions. In some embodiments of the disclosure, the UE 10 is not a general purpose computing device like a portable, laptop or tablet computer, but rather is a special-purpose communications device such as a mobile phone, a wireless handset, a pager, a PDA, or a telecommunications device installed in a vehicle. In another embodiment, the UE 10 may be a portable, laptop or other computing device. The UE 10 may support specialized activities such as gaming, inventory control, job control, and/or task management functions, and so on.

The UE 10 includes a display 402. The UE 10 also includes a touch-sensitive surface, a keyboard or other input keys generally referred as 404 for input by a user. The keyboard may be a full or reduced alphanumeric keyboard such as QWERTY, Dvorak, AZERTY, and sequential types, or a traditional numeric keypad with alphabet letters associated with a telephone keypad. The input keys may include a trackwheel, an exit or escape key, a trackball, and other navigational or functional keys, which may be inwardly depressed to provide further input function. The UE 10 may present options for the user to select, controls for the user to actuate, and/or cursors or other indicators for the user to direct.

The UE 10 may further accept data entry from the user, including numbers to dial or various parameter values for configuring the operation of the UE 10. The UE 10 may further execute one or more software or firmware applications in response to user commands. These applications may configure the UE 10 to perform various customized functions in response to user interaction. Additionally, the UE 10 may be programmed and/or configured over-the-air, for example from a wireless base station, a wireless access point, or a peer UE 10.

Among the various applications executable by the UE 10 are a web browser, which enables the display 402 to show a web page. The web page may be obtained via wireless communications with a wireless network access node, a cell tower, a peer UE 10, or any other wireless communication network or system 400. The network 400 is coupled to a wired network 408, such as the Internet. Via the wireless link and the wired network, the UE 10 has access to information on various servers, such as a server 410. The server 410 may provide content that may be shown on the display 402. Alternately, the UE 10 may access the network 400 through a peer UE 10 acting as an intermediary, in a relay type or hop type of connection.

Figure 5:
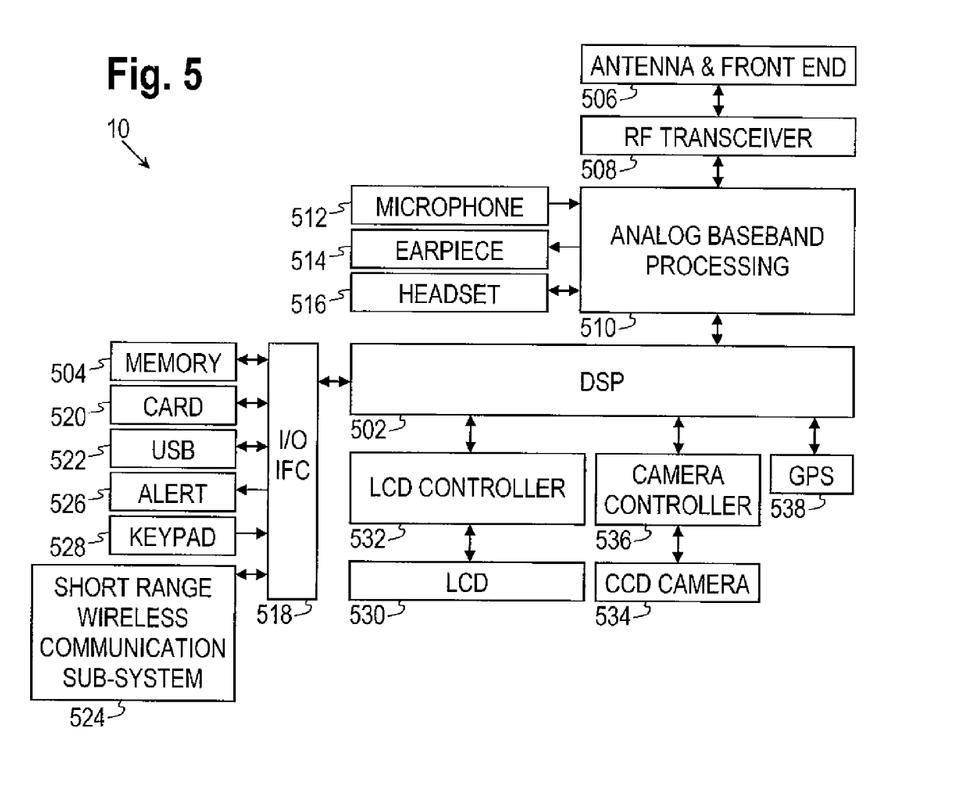
FIG. 5 is a block diagram of a user equipment operable for some of the various embodiments of the disclosure.

FIG. 5 shows a block diagram of the UE 10. While a variety of known components of UEs 10 are depicted, in an embodiment a subset of the listed components and/or additional components not listed may be included in the UE 10. The UE 10 includes a digital signal processor (DSP) 502 and a memory 504. As shown, the UE 10 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, a short range wireless communication sub-system 524, an alert 526, a keypad 528, a liquid crystal display (LCD), which may include a touch sensitive surface 530, an LCD controller 532, a charge-coupled device (CCD) camera 534, a camera controller 536, and a global positioning system (GPS) sensor 538. In an embodiment, the UE 10 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the UE 10 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the UE 10 to send and receive information from a cellular network or some other available wireless communications network or from a peer UE 10. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF Transceiver 508, portions of the Antenna and Front End 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset 516 and outputs to the earpiece 514 and the headset 516. To that end, the analog baseband processing unit 510 may have ports for connecting to the built-in microphone 512 and the earpiece speaker 514 that enable the UE 10 to be used as a cell phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB interface 522 and the short range wireless communication sub-system 524. The USB interface 522 may be used to charge the UE 10 and may also enable the UE 10 to function as a peripheral device to exchange information with a personal computer or other computer system. The short range wireless communication sub-system 524 may include an infrared port, a Bluetooth interface, an IEEE 802.11 compliant wireless interface, or any other short range wireless communication sub-system, which may enable the UE 10 to communicate wirelessly with other nearby mobile devices and/or wireless base stations.

The input/output interface 518 may further connect the DSP 502 to the alert 526 that, when triggered, causes the UE 10 to provide a notice to the user, for example, by ringing, playing a melody, or vibrating. The alert 526 may serve as a mechanism for alerting the user to any of various events such as an incoming call, a new text message, and an appointment reminder by silently vibrating, or by playing a specific pre-assigned melody for a particular caller.

The keypad 528 couples to the DSP 502 via the interface 518 to provide one mechanism for the user to make selections, enter information, and otherwise provide input to the UE 10. The keyboard 528 may be a full or reduced alphanumeric keyboard such as QWERTY, Dvorak, AZERTY and sequential types, or a traditional numeric keypad with alphabet letters associated with a telephone keypad. The input keys may include a trackwheel, an exit or escape key, a trackball, and other navigational or functional keys, which may be inwardly depressed to provide further input function. Another input mechanism may be the LCD 530, which may include touch screen capability and also display text and/or graphics to the user. The LCD controller 532 couples the DSP 502 to the LCD 530.

The CCD camera 534, if equipped, enables the UE 10 to take digital pictures. The DSP 502 communicates with the CCD camera 534 via the camera controller 536. In another embodiment, a camera operating according to a technology other than Charge Coupled Device cameras may be employed. The GPS sensor 538 is coupled to the DSP 502 to decode global positioning system signals, thereby enabling the UE 10 to determine its position. Various other peripherals may also be included to provide additional functions, e.g., radio and television reception.

Figure 6:
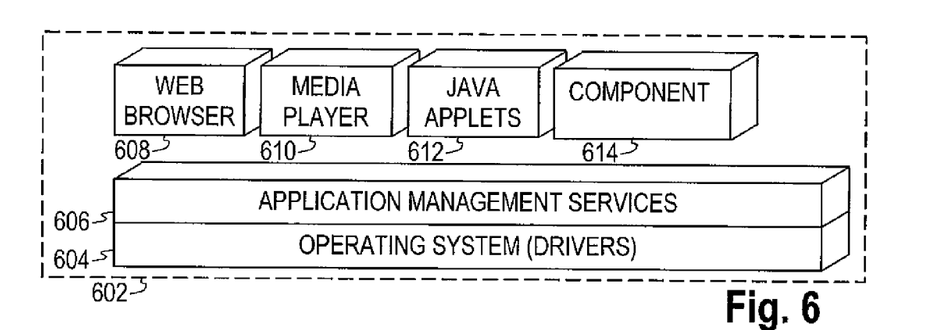
FIG. 6 is a diagram of a software environment that may be implemented on a user equipment operable for some of the various embodiments of the disclosure.

FIG. 6 illustrates a software environment 602 that may be implemented by the DSP 502. The DSP 502 executes operating system drivers 604 that provide a platform from which the rest of the software operates. The operating system drivers 604 provide drivers for the wireless device hardware with standardized interfaces that are accessible to application software. The operating system drivers 604 include application management services ("AMS") 606 that transfer control between applications running on the UE 10. Also shown in FIG. 6 are a web browser application 608, a media player application 610, and Java applets 612. The web browser application 608 configures the UE 10 to operate as a web browser, allowing a user to enter information into forms and select links to retrieve and view web pages. The media player application 610 configures the UE 10 to retrieve and play audio or audiovisual media. The Java applets 612 configure the UE 10 to provide games, utilities, and other functionality. A component 614 might provide functionality related to the control signal management.

Figure 7:
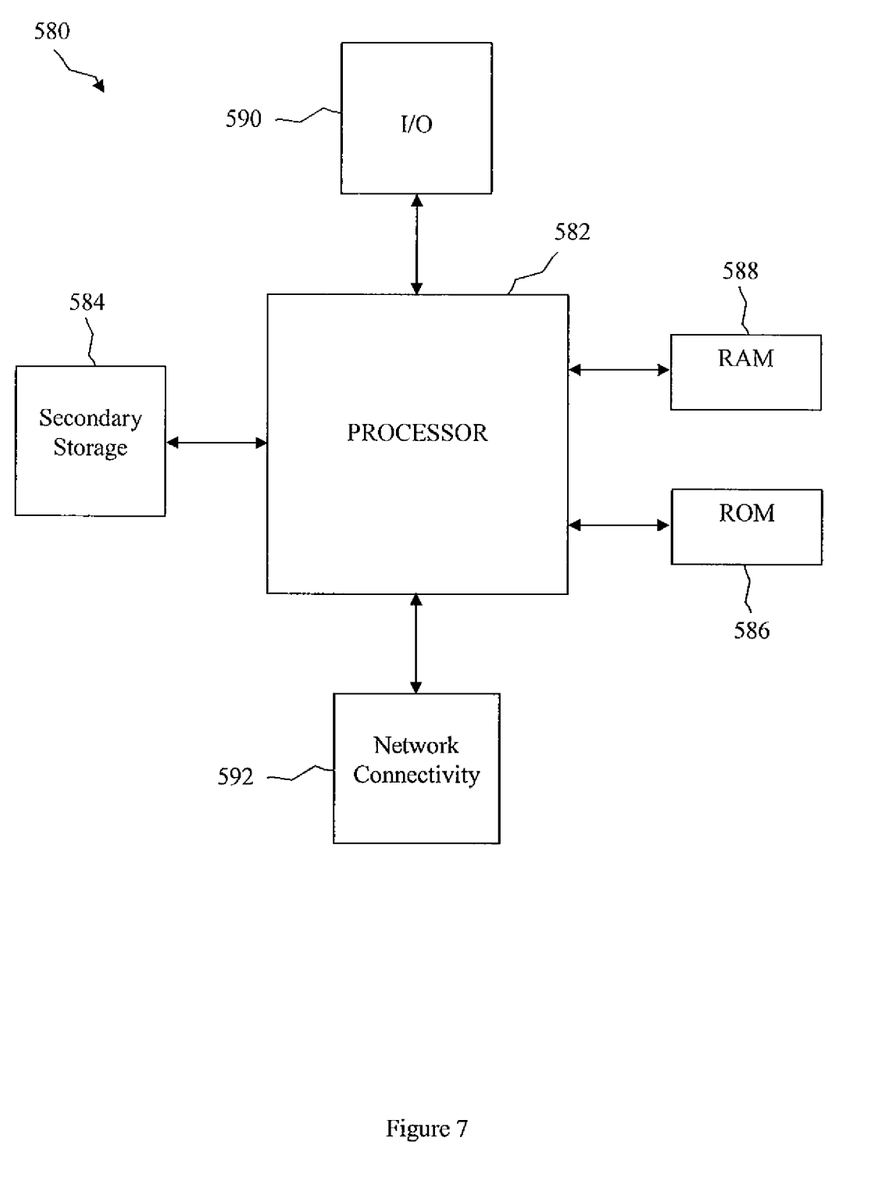
FIG. 7 illustrates an exemplary general-purpose computer system suitable for implementing the several embodiments of the present disclosure.

The system described above may be implemented on any general-purpose computer with sufficient processing power, memory resources, and network throughput capability to handle the necessary workload placed upon it. FIG. 7 illustrates a typical, general-purpose computer system suitable for implementing one or more embodiments disclosed herein. The computer system 580 includes a processor 582 (which may be referred to as a central processor unit or CPU) that is in communication with memory devices including secondary storage 584, read only memory (ROM) 586, random access memory (RAM) 588, input/output (I/O) devices 590, and network connectivity devices 592. The processor 582 may be implemented as one or more CPU chips.

The secondary storage 584 is typically comprised of one or more disk drives or tape drives and is used for non-volatile storage of data and as an over-flow data storage device if RAM 588 is not large enough to hold all working data. Secondary storage 584 may be used to store programs which are loaded into RAM 588 when such programs are selected for execution. The ROM 586 is used to store instructions and perhaps data which are read during program execution. ROM 586 is a non-volatile memory device which typically has a small memory capacity relative to the larger memory capacity of secondary storage. The RAM 588 is used to store volatile data and perhaps to store instructions. Access to both ROM 586 and RAM 588 is typically faster than to secondary storage 584.

I/O devices 590 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 592 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 592 may enable the processor 582 to communicate with an Internet or one or more intranets. With such a network connection, it is contemplated that the processor 582 might receive information from the network, or might output information to the network in the course of performing the above-described method steps. Such information, which is often represented as a sequence of instructions to be executed using processor 582, may be received from and outputted to the network, for example, in the form of a computer data signal embodied in a carrier wave. The network connectivity devices 592 may also include one or more transmitter and receivers for wirelessly or otherwise transmitting and receiving signal as are well know to one of ordinary skill in the art.

Such information, which may include data or instructions to be executed using processor 582 for example, may be received from and outputted to the network, for example, in the form of a computer data baseband signal or signal embodied in a carrier wave. The baseband signal or signal embodied in the carrier wave generated by the network connectivity devices 592 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 582 executes instructions, codes, computer programs, scripts which it accesses from hard disk, floppy disk, optical disk (these various disk based systems may all be considered secondary storage 584), ROM 586, RAM 588, or the network connectivity devices 592. While only one processor 582 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A user equipment (UE), comprising:
a processor configured to:
transmit control plane data during an unscheduled on-duration associated with a discontinuous reception (DRX) mode of operation;
start a timer subsequent to transmission of the control plane data during the unscheduled on-duration, the timer defining a period of time during which the UE remains awake after the control plane data is transmitted in the unscheduled on-duration, wherein the period of time is specified by an enhanced node B (ENB), and
transition to a scheduled off-duration when the period of time expires, wherein scheduled on-durations and scheduled off-durations of the UE are not changed by the unscheduled on-duration,
wherein the DRX mode of operation defines a scheduled on-duration followed by a scheduled off-duration.

2. The UE of claim 1 wherein the processor is further configured to transmit user plane data only during the scheduled on-durations.

3. The UE of claim 2 wherein the user plane data includes application layer data including VoIP data packets, and data packets containing information related to web browsing, emailing, and other user applications.

4. The UE of claim 1 wherein the control plane data includes control signaling including at least one of:
   a Layer 1 scheduling request;
   a Layer 2 radio resource control (RRC) message; or
   a mobility measurement message.

5. The UE of claim 1 wherein the timer is a response timer configured to keep the UE awake for a period of time sufficient for the UE to receive a response signal or other control signal from the ENB.

6. The UE of claim 1 further comprising a timing alignment timer configured to promote uplink synchronization between the UE and the ENB, the timing alignment timer to measure a predefined time and promote release of channel resources upon expiration of the timing alignment timer.

7. The UE of claim 6 wherein the UE releases the channel resources when the UE does not receive a timing alignment signal from the ENB for the predefined time.

8. A method of transmitting control plane data from a user equipment (UE) to an enhanced node B (ENB), the method comprising:
   transmitting control plane data during an unscheduled on-duration associated with a discontinuous reception (DRX) mode of operation;
   starting a timer subsequent to transmitting the control plane data during the unscheduled on-duration, the timer defining a period of time during which the UE remains awake after the control plane data is transmitted during the unscheduled on-duration, wherein the period of time is specified by the ENB; and
   transitioning to a scheduled off-duration when the period of time expires, wherein scheduled on-durations and scheduled off-durations of the UE are not changed by the unscheduled on-duration,
   wherein the DRX mode of operation defines a scheduled on-duration followed by a scheduled off-duration.

9. The method of claim 8, further comprising transmitting user plane data only during the scheduled on-durations.

10. The method of claim 9, wherein the user plane data comprises application layer data comprising VoIP data packets, and data packets containing information related to web browsing, emailing, and other user applications.

11. The method of claim 8, wherein the control plane data comprises control signaling comprising at least one of:
   a Layer 1 scheduling request;
   a Layer 2 radio resource control 'RRC' message; or
   a mobility measurement message.

12. The method of claim 8, wherein the timer is a response timer configured to keep the UE awake for a period of time sufficient for the UE to receive a response signal or other control signal from the ENB.

13. The method of claim 8, further comprising measuring a predefined time and promoting release of channel resources upon expiration of a timing alignment timer, and releasing the channel resources when the UE does not receive a timing alignment signal from the ENB for the predefined time.

14. A non-transitory computer readable medium storing instructions that when executed by one or more processors cause the one or more processors to:
   transmit control plane data during an unscheduled on-duration associated with a discontinuous reception (DRX) mode of operation;
   start a timer subsequent to transmitting the control plane data during the unscheduled on-duration, the timer defining a period of time during which the UE remains awake after the control plane data is transmitted during the unscheduled on-duration, wherein the period of time is specified by the ENB; and
   transition to a scheduled off-duration when the period of time expires, wherein scheduled on-durations and scheduled off-durations of the UE are not changed by the unscheduled on-duration,
   wherein the DRX mode of operation defines a scheduled on-duration followed by a scheduled off-duration.

* * * * *